(12) United States Patent
Matsumura et al.

(10) Patent No.: US 12,482,891 B2
(45) Date of Patent: Nov. 25, 2025

(54) METHODS AND APPARATUS TO INCREASE STACKING PRESSURE IN BATTERY CELLS

(71) Applicant: Intel Corporation, Santa Clara, CA (US)

(72) Inventors: Naoki Matsumura, San Jose, CA (US); Eric Erike, Mesa, AZ (US); Juha Paavola, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 729 days.

(21) Appl. No.: 17/706,245

(22) Filed: Mar. 28, 2022

(65) Prior Publication Data

US 2022/0216561 A1    Jul. 7, 2022

(51) Int. Cl.
*H01M 50/42* (2021.01)
*H01M 10/058* (2010.01)
*H01M 10/48* (2006.01)
*H01M 50/242* (2021.01)

(52) U.S. Cl.
CPC ....... *H01M 50/242* (2021.01); *H01M 10/058* (2013.01); *H01M 10/48* (2013.01)

(58) Field of Classification Search
CPC .. H01M 50/242; H01M 10/058; H01M 10/48; H01M 10/4257; H01M 50/233; H01M 50/474; H01M 50/483; H01M 50/486; H01M 50/409
See application file for complete search history.

(56) References Cited

U.S. PATENT DOCUMENTS

| 10,283,807 B2 * | 5/2019 | Busacca | H01M 50/471 |
| 2018/0151856 A1 * | 5/2018 | Fischer | H01M 50/105 |
| 2019/0252688 A1 * | 8/2019 | Sawada | H01M 12/08 |

OTHER PUBLICATIONS

Cui et al., "Effect of continuous pressures on electrochemical performance of Si anodes," made available Jan. 4, 2021, 7 pages.

* cited by examiner

*Primary Examiner* — Lisa S Park
(74) *Attorney, Agent, or Firm* — Hanley, Flight & Zimmerman, LLC

(57) ABSTRACT

Methods, apparatus, systems, and articles of manufacture to increase stacking pressure in battery cells are disclosed. A disclosed battery includes an anode layer and a cathode layer stacked with the anode layer. The disclosed battery further includes a tension bearing structure to extend through at least one of the anode layer or the cathode layer.

24 Claims, 7 Drawing Sheets

METHODS AND APPARATUS TO INCREASE STACKING PRESSURE IN BATTERY CELLS

FIELD OF THE DISCLOSURE

This disclosure relates generally to batteries and, more particularly, to methods and apparatus to increase stacking pressure in battery cells.

BACKGROUND

Many different materials may be employed in batteries to store chemical energy that may be converted into electrical energy. Different materials used in a battery have different energy densities that can affect the life of the battery corresponding to the time between being fully charged and fully discharged. Some batteries are rechargeable so as to be used multiple times. However, the duration of battery life between charges typically decreases over time as the battery is repeatedly recharged. Thus, rechargeable batteries usually have a useful cycle life defined by a limited number of recharges.

Figure 1:
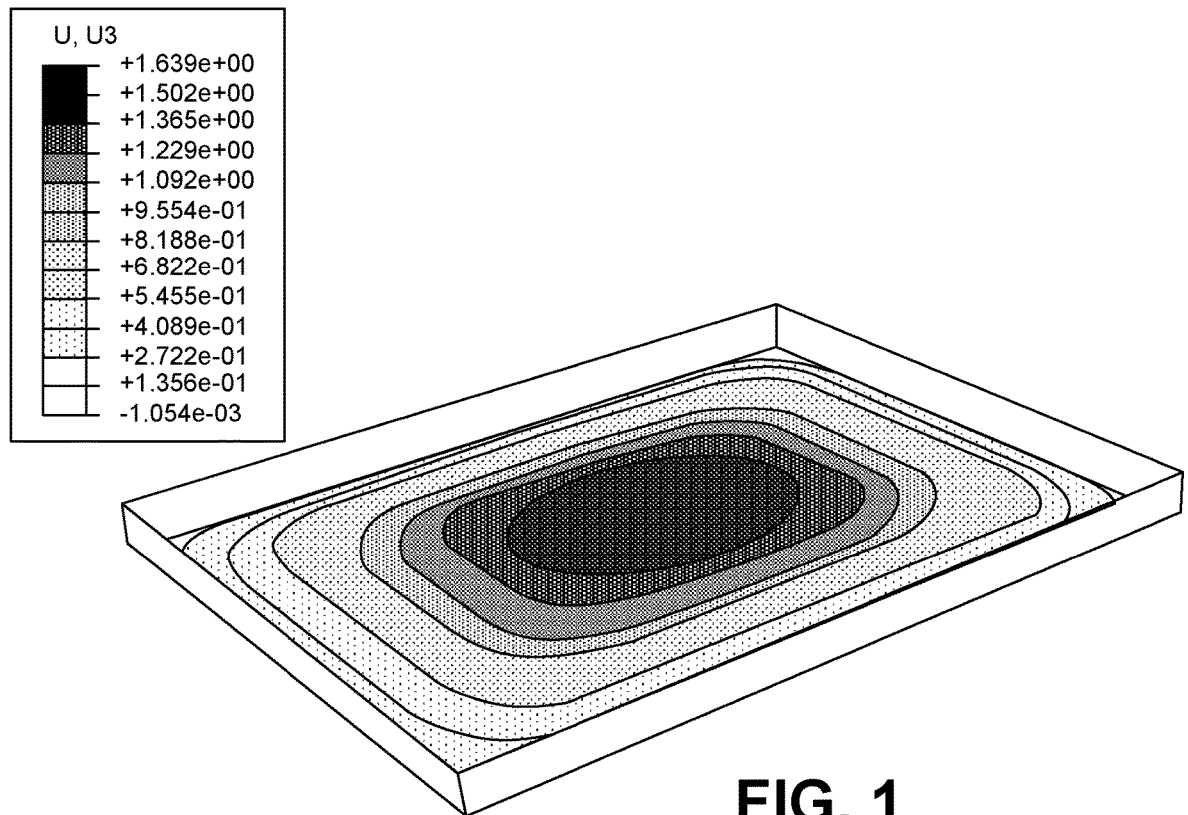
FIG. 1 illustrates the results of a simulation showing an amount of deflection (in millimeters) of a battery that does not include tension bearing structures as disclosed herein.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

DETAILED DESCRIPTION

Lithium ion (Li-ion) batteries are frequently used as an energy storage system for portable electronic devices (e.g., smartphones, laptops, tablets, etc.). In recent years, the energy density of Li-ion batteries has increased approximately 4-5% every year, but efforts continue to increase the energy density further and/or otherwise construct batteries to increase battery life. In the past, the anode of a Li-ion battery includes graphite. More recently, anodes made of silicon and/or lithium metal have been shown to have an energy density that is more than 20% greater than batteries implemented using graphite-based anodes. As a result, such materials have the potential to significantly increase the life of batteries relative to previous approaches. For instance, if a traditional (graphite anode) battery has a battery life of approximately 8 hours, a similarly constructed battery that uses a silicon and/or lithium anode is expected to have a battery life of approximately 10.4 hours. However, the use of silicon and/or lithium anodes presents particular challenges that can make it difficult to realize this full increase to battery life.

In particular, silicon and/or lithium anodes swell or expand during charge and shrink or contract during discharge. Such swelling and shrinking can result in relatively significant amounts of deformation and/or deflections in the battery. For instance, FIG. 1 illustrates the results of a simulation showing a deflection of approximately 1.6 mm across a battery that is 4 mm thick, 60 mm wide, and 80 mm long. Such deformations and/or deflections can give rise to cracks and/or voids forming in the battery, which can lead to significant reductions in battery life during a single charge cycle and/or significantly reduce the overall useful cycle life of the battery for which such a battery may be used (e.g., from 500 recharges to 100 recharges). To reduce the effects of swelling and shrinkage during charge and discharge, batteries with silicon and/or lithium anodes may be constructed to be held under pressure (e.g., between about 0.5 atmospheres (atm) to about 0.6 atm above atmospheric pressure).

Maintaining pressure on a stack of materials (including the anode) in a battery can be achieved by increasing the thickness of the walls of the package or housing surrounding the stack of materials in the battery. More particularly, simulated testing has shown that a 0.5 atm stacking pressure for a battery (e.g., the battery of FIG. 1) can be achieved by increasing the package wall thickness by approximately 0.3 mm up to a total thickness of approximately 0.6 mm relative to a traditional battery (that includes a graphite-based anode). While this increase (e.g., doubling) of the package wall thickness serves to improve the number of recharges possible during the useful cycle life of the battery, the thickness can be problematic for the life of the battery for a single charge when the overall thickness for the battery is limited by other design constraints. That is, to provide for such an increase in wall thickness means that the thickness of the anode and/or cathode layers within the battery stack need to decrease. As a result, even though silicon and/or lithium anodes have a much higher energy density than traditional graphite anodes, the reduced space for such silicon and/or lithium anodes (due to thicker packaging walls) results in a reduction to battery life relative to traditional batteries when the overall battery package size is fixed. More particularly, this reduction in space for the battery package can result in a battery life of approximately 6.2 hours (down from the 8 hours for the traditional battery as noted above). Furthermore, the increased thickness of the package wall of the above example results in an increase to the overall weight of the battery. For instance, a typical battery (with a graphite based anode) that 4 mm by 60 mm by 80 mm has a housing that weighs approximately 12.5 g, whereas the housing with thicker walls weighs approximately 25 g.

Examples disclosed herein overcome the above challenges to batteries that implement silicon and/or lithium anodes by creating the needed stacking pressure to limit deformations in the battery without increasing the package wall thickness. As a result, examples disclosed herein do not significantly limit the amount of space available for the stack of materials in the battery relative to traditional batteries, thereby enabling longer battery lives due to the increased energy density of the materials used. Furthermore, examples disclosed herein do not add significantly to the overall weight of the battery. More particularly, examples disclosed herein include elongate tension bearing structures (e.g., shafts, rods, bars, pillars, springs, etc.) that extend through the stack of materials within a battery to impose a compressive force on the stack of materials. The elongate tension bearing structures are structured and positioned so that the compressive force on the battery stack correspond to the needed pressure to hold the silicon and/or lithium anode particles together to reduce (e.g., avoid) the formation of cracks and/or voids that can lead to a significant reduction in the useful cycle life of the battery. While examples disclosed herein are described with respect to Li-ion batteries, teachings disclosed herein can be applied to batteries implemented using other chemistries (e.g., Mg-ion batteries, Al-ion batteries, etc.).

Figure 2:
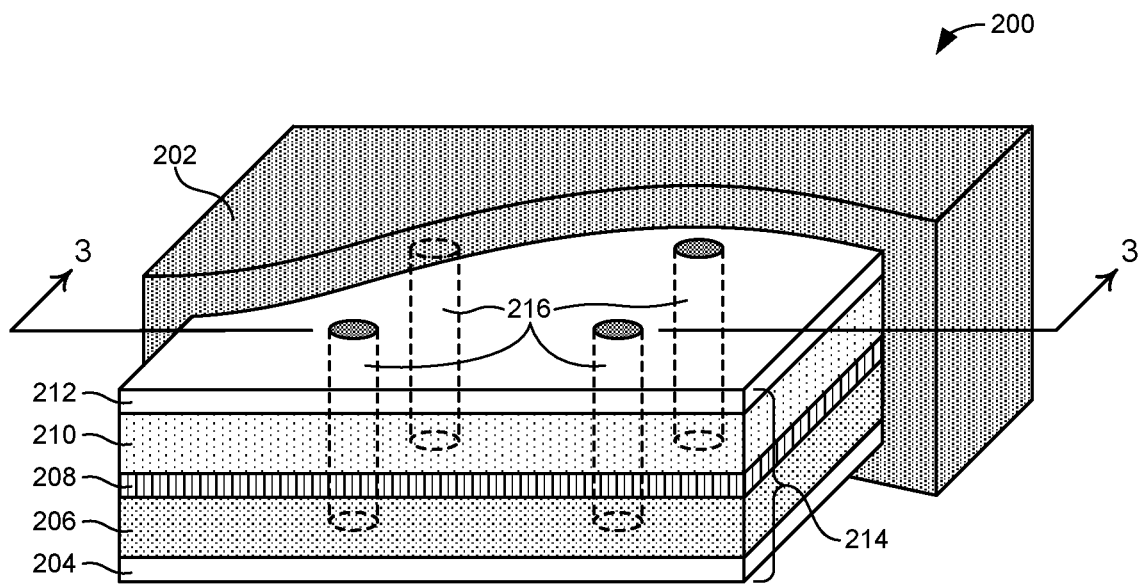
FIG. 2 illustrates an example battery constructed in accordance with teachings disclosed herein
Figure 3:
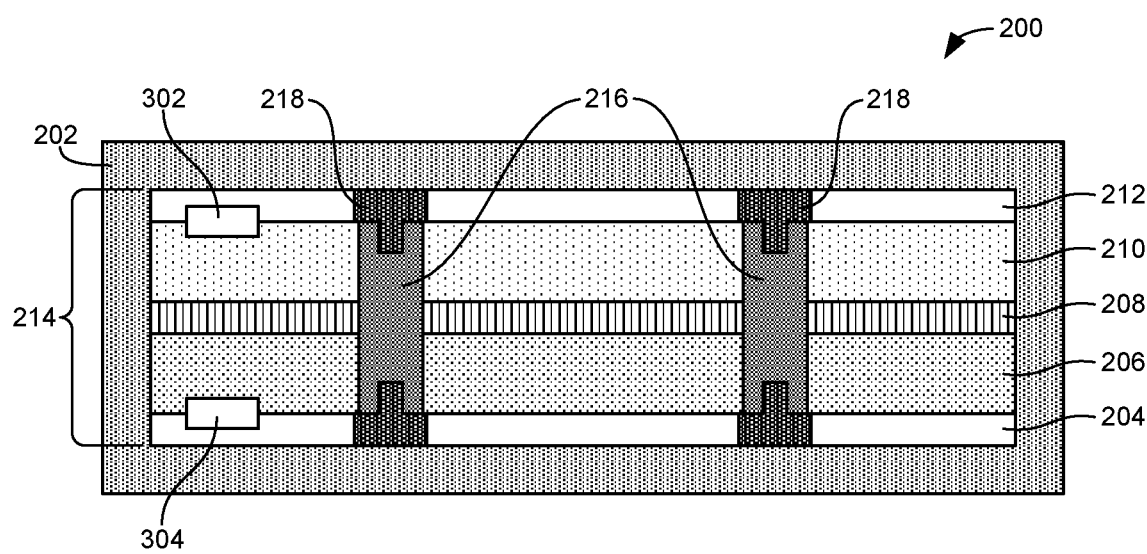
FIG. 3 illustrates a cross-sectional view of the example battery of FIG. 2.

FIG. 2 illustrates an example battery 200 constructed in accordance with teachings disclosed herein with an external package or housing 202 partially cutaway. FIG. 3 illustrates a cross-sectional view of the example battery 200 taken along the line 3-3 of FIG. 2. The illustrated example of FIGS. 2 and 3 illustrate a simple battery cell that includes a single stack of materials including a cathode current collector 204, a cathode 206, a separator 208, an anode 210, and an anode current collector 212. For purposes of explanation, the stack of materials within the battery 200 are collectively referred to herein as a battery cell stack 214.

As shown in the illustrated example, the cathode current collector 204 is stacked adjacent the cathode 206, which corresponds to the positive terminal or electrode of the battery 200. In this example, the cathode current collector 204 is implemented with aluminum, but any other suitable conductive material may additionally or alternatively be used (e.g., metal sheet coated with aluminum oxide). The cathode 206 is implemented with any suitable material that can carry lithium ions. More particularly, in some examples, the cathode 206 includes one or more of cobalt, manganese, or nickel.

As shown in the illustrated example, the anode current collector 212 is stacked adjacent the anode 210, which corresponds to the negative terminal or electrode of the battery 200. In this example, the anode current collector 212 is implemented with copper, but any other suitable conductive material may additionally or alternatively be used (e.g., aluminum). In some examples, the anode 210 is implemented with any suitable material that can carry lithium ions. More particularly, in some examples, the anode 210 includes silicon. In some examples, the anode 210 is implemented with lithium. That is, in such examples, the base material for the anode 210 is lithium (rather than being some other material that merely carries lithium ions).

As shown in the illustrated example, the separator 208 is positioned between the cathode 206 and the anode 210. In some examples, the separator 208 is implemented with any suitable material or layers of materials that can electrically isolate the cathode 206 and the anode 210 while allowing the transport of lithium ions therethrough during the charging and discharging of the battery 200. More particularly, in some examples, the separator 208 is based on at least one of polyolefin such as polypropylene and/or polyethylene, a polymer electrolyte, and/or a solid-state electrolyte.

In the illustrated example, the external package 202 surrounds and/or encloses the battery cell stack 214 of the example battery 200 including the cathode current collector 204, the cathode 206, the separator 208, the anode 210, and the anode current collector 212. The external package 202 can be implemented using any suitable material (e.g., polypropylene-coated stainless steel, polypropylene-coated aluminum, etc.)

As shown in FIGS. 2 and 3, a plurality of tension bearing structures 216 extend through the battery cell stack 214. In some examples, the tension bearing structures 216 are to be in tension between opposite sides of the battery cell stack 214 so as to create a compressive force on the battery cell stack 214. In some examples, the tension bearing structures 216 can be in a neutral state (neither in tension nor in compression) when the battery cell stack 214 is at a smallest size (e.g., shrunken when discharging) but are placed into tension as the battery cell stack 214 swells during charging. In other examples, the tension bearing structures 216 are constantly under tension regardless of the swelling or shrinking of the battery cell stack 214. In such examples, the amount of tension in the tension bearing structures 216 increases when the battery cell stack 214 expands. The tension in the tension bearing structures 216, and the resulting compression in the battery cell stack 214, maintains pressure on the anode 210 to reduce (e.g., minimize) the deflection and/or deformation of the battery cell stack 214 due to swelling and shrinkage during charge and discharge.

In the illustrated example of FIGS. 2 and 3, the tension bearing structures 216 are elongate pillars, pins, rods, bars, or shafts that extend through the battery cell stack 214 (e.g., in a direction transverse to the stacked layers of the battery cell stack). However, the tension bearing structures 216 can be any other suitable shape. For instance, in some examples, the tension bearing structures 216 are spring-shaped, are accordion-shaped, and/or are sheets that define planes extending transverse to the layers in the battery cell stack 214. Further, in the illustrated example, the tension bearing structures 216 have circular cross-sections. However, in other examples, the tension bearing structures 216 can have any other suitable cross-section. For instance, in some examples, the tension bearing structures 216 can have a honeycomb cross-section, an oval cross-section, a rectangular cross-section, etc. Further, while the example tension bearing structures 216 are shown to be solid in FIGS. 2 and 3, in other examples, the tension bearing structures 216 can have a hollow interior. Further, the tension bearing structures 216 can be dimensioned with any suitable width (e.g., diameter). In some examples, the width of the tension bearing structures 216 is 5 mm or less (e.g., 4 mm, 3 mm, 2 mm, 1 mm). In some examples, the width of the tension bearing structures 216 is less than 1 mm (e.g., 500 um, 200 um, 100 um, 50 um, etc.) In some examples, different ones of the tension bearing structures 216 in the same battery 200 have different shapes, sizes, and/or cross-sections. Further, any suitable number (e.g., 1, 2, 3, 4, 5, 10, 15, etc.) of tension bearing structures 216 can be positioned to extend through the battery cell stack 214. Additionally, the tension bearing structures 216 can be positioned or distributed at any suitable locations across the area of the layers of the battery cell stack 214 and arranged in any suitable manner.

In some examples, each of the cathode current collector 204, the cathode 206, the separator 208, the anode 210, and the anode current collector 212 is in direct contact with (e.g., abuts against) an exterior surface of the tension bearing structures 216. In other examples, the tension bearing structures 216 extend through holes in the layers of the battery cell stack 214 that have a larger width (e.g., larger diameter) than the width (e.g., outer diameters) of the tension bearing structures 216. In such examples, at least one of the cathode current collector 204, the cathode 206, the separator 208, the anode 210, or the anode current collector 212 are spaced apart from the tension bearing structures 216.

In some examples, the tension bearing structures 216 are mechanically affixed to the cathode current collector 204 at a first end of the tension bearing structures 216 and mechanically affixed to the anode current collector 212 at a second end of the tension bearing structures 216. In this manner, as the battery cell stack 214 (and, specifically, the anode 210) expands, tensile forces in the tension bearing structures 216 will pass to the current collectors 204, 212, thereby resulting in compressive forces acting on the cathode 206, separator 208, and anode 210 sandwiched between the current collectors 204, 212. In some examples, the tension bearing structures 216 are mechanically affixed to the anode current collector 212 at a first end of the tension bearing structures 216 and mechanically affixed to the separator 208 at a second end of the tension bearing structures 216. In this manner, as the anode 210 expands, tensile forces in the tension bearing structures 216 will pass to the current collector 212 and the separator 208, thereby resulting in compressive forces acting on the anode 210 sandwiched between the current collector 212 and the separator 208.

Additionally or alternatively, in some examples, the tension bearing structures 216 are mechanically affixed to opposing walls of the package 202 surrounding the battery cell stack 214. In such examples, the package walls apply pressure to the entire battery cell stack 214 during swelling due to the tensile forces in the tension bearing structures 216 extending between the package walls. In some examples, one of the ends of the tension bearing structures 216 is mechanically affixed to one of the current collectors 204, 212 and the other end of the tension bearing structures 216 is mechanically affixed to an opposite wall of the package 202. In such examples, the layers of the battery cell stack 214 are compressed between one of the current collectors 204, 212 and the opposite wall of the package 202. While the ends of the tension bearing structures 216 are affixed to the current collectors 204, 212 and/or the package 202, in some examples, the tension bearing structures 216 are not directly affixed to any of the cathode 206, the separator 208, and the anode 210. That is, there is no direct attachment between the portions of the length of the structures 216 passing through the cathode 206, the separator 208, and the anode 210 and the corresponding layers through which such portions of the structures 216 pass. As a result, the cathode 206, the separator 208, and/or the anode 210 can shift and move relative to the tension bearing structures 216 (in a direction aligned with the axial length of the structures 216) during expansion and/or contraction of layers of the battery cell stack 214.

The tension bearing structures 216 are made from any suitable material that can withstand axial tension (e.g., epoxy, glass or other ceramic, metal, carbon fibers, nanotubes, etc.). In some examples, the tension bearing structures 216 are made of rigid materials that resist expansion. In other examples, the tension bearing structures 216 are made of resilient (e.g., elastic) materials that are stretched in tension to resist further expansion. In some examples, the tension bearing structures 216 are ionically conductive to enable the transport of lithium ions between the cathode 206 and the anode 210. However, in some examples, the tension bearing structures 216 are implemented with an electrically insulative material so as to prevent a short circuit between the cathode 206 (and the associated cathode current collector 204) and the anode 210 (and the associated anode current collector 212). More particularly, in some examples, the tension bearing structures 216 have an electrically insulative shell or exterior with an electrically conductive (e.g., metal) core. In other examples, the tension bearing structures 216 is electrically insulative (e.g., epoxy, ceramic) across an entire cross-section of the structures.

In some examples, the tension bearing structures 216 are electrically insulative along a length of the structures that spans at least the distance across the separator 208 (to avoid short circuit between the two electrodes) but have an exposed conductive surface at one or both ends of the structures 216 to facilitate attachment to the current collectors 204, 212 and/or the walls of the package 202. More particularly, in the illustrated example shown in FIG. 3, the tension bearing structures 216 include metal caps 218 at each end of a main body of the structures 216 to enable the rigid attachment (e.g., via welding (e.g., laser welding, ultrasonic welding), soldering, etc.) to the current collectors 204, 212 (and/or the walls of the package 202). Additionally or alternatively, in some examples, the tension bearing structures 216 are mechanically coupled to the current collectors 204, 212 (and/or the walls of the package 202) via an adhesive. The metal caps 218 are shown in FIG. 3 for purposes of illustration but are optional. That is, in other examples, the metal caps 218 are omitted.

Figure 4:
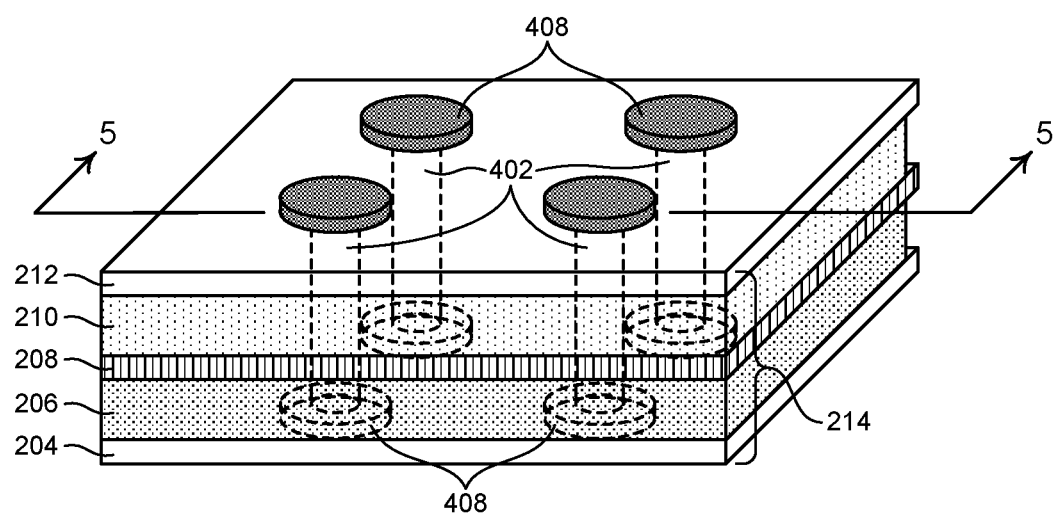
FIG. 4 illustrates the example battery cell stack of FIGS. 2 and 3 with different example tension bearing structures extending therethrough.
Figure 5:
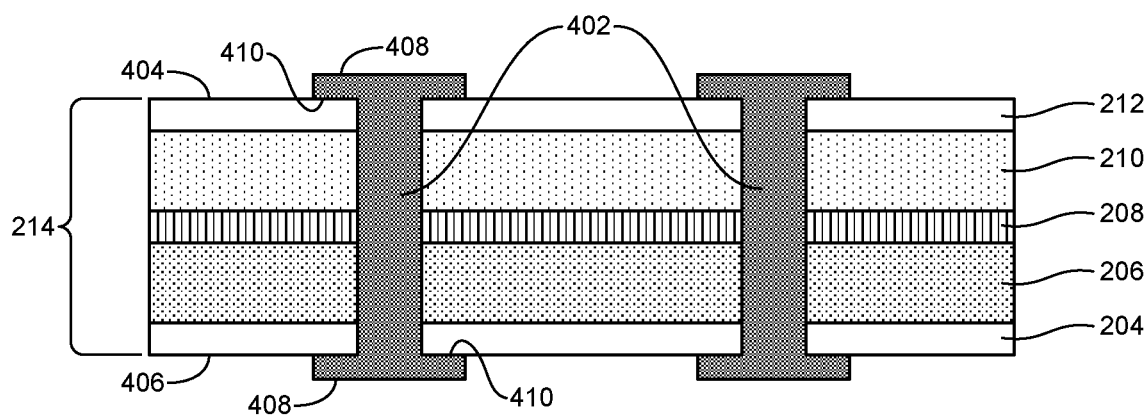
FIG. 5 illustrates a cross-sectional view of the example battery cell stack of FIG. 4.

FIG. 4 illustrates the example battery cell stack 214 of FIGS. 2 and 3 with different example tension bearing structures 402 extending therethrough. FIG. 5 illustrates a cross-sectional view of the example battery cell stack 214 taken along the line 5-5 of FIG. 4. In this example, the ends of the tension bearing structures 402 extend beyond an outer surface 404 of the anode current collector 212 and extend beyond an outer surface 406 of the cathode current collector 204. More particularly, as shown in the illustrated example, the ends of the tension bearing structures 402 include flanges or outcroppings 408 that include inner surfaces 410 that interface with and/or abut the outer surfaces 404, 406 of the current collectors 204, 212. As a result, when the battery cell stack 214 swells, the interfacing surfaces 410 of the flanges 408 will impose a compressive force on the battery cell stack 214 (with corresponding tensile forces created along the length of the main shaft or body of tension bearing structures 402). Although the flanges 408 are shown with a circular shape, different shapes are possible (e.g., a square shape, a rectangular, an X shape, etc.) and the extend of the radial outcropping can be adapted to any suitable extent. Inasmuch as the flanges 408 provide a mechanical interface with the outer surfaces 404, 406 of the current collectors 204, 212, there is no need for the tension bearing structures to be rigidly affixed (e.g., via welding, soldering, etc.) to the current collectors 204, 212.

Figure 6:
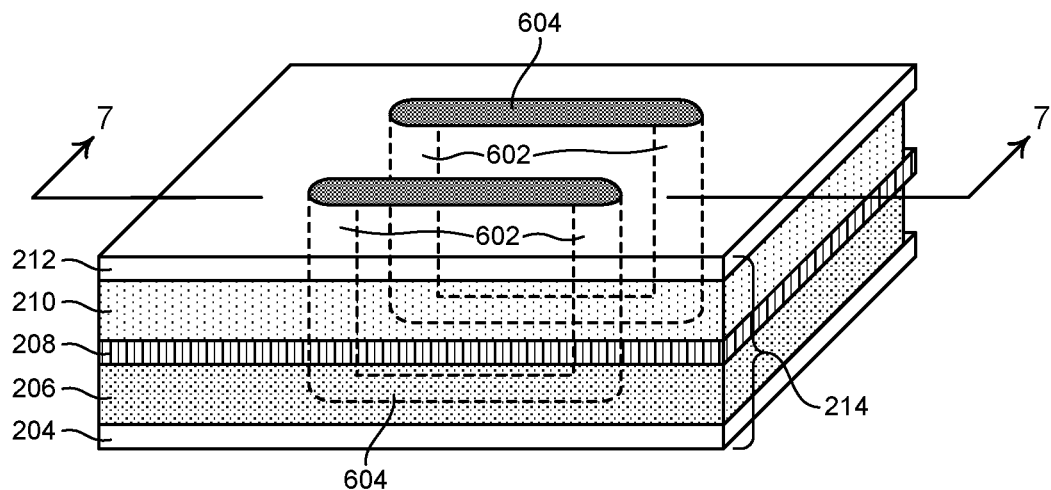
FIG. 6 illustrates the example battery cell stack of FIGS. 2 and 3 with different example tension bearing structures extending therethrough.
Figure 7:
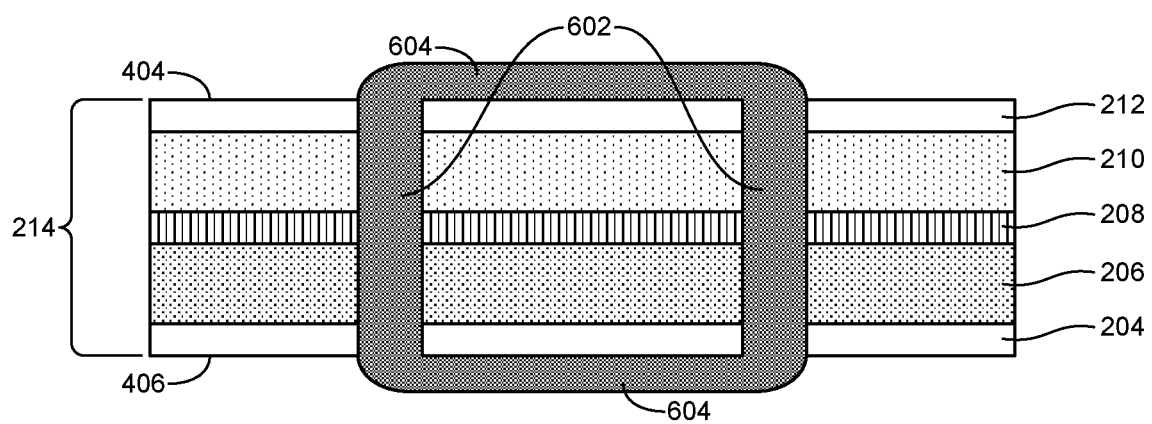
FIG. 7 illustrates a cross-sectional view of the example battery cell stack of FIG. 4.

FIG. 6 illustrates the example battery cell stack 214 of FIGS. 2 and 3 with different example tension bearing structures 602 extending therethrough. FIG. 7 illustrates a cross-sectional view of the example battery cell stack 214 taken along the line 7-7 of FIG. 6. In this example, the ends of the tension bearing structures 602 extend beyond the outer surfaces 404, 406 of the current collector 204, 212. Further, as shown in the illustrated example, the ends of different ones of the tension bearing structures 602 are interconnected by cross-support structures 604 that extend along the outer surfaces 404, 406 of the current collector 204, 212. In this configuration, the battery cell stack 214 is sandwiched between the cross-support structures 604 attached to opposite ends of the tension bearing structures 602. As a result, when the battery cell stack 214 swells, the cross-support structures 604 will impose a compressive force on the battery cell stack 214 (with corresponding tensile forces created along the length of the main shaft or body of tension bearing structures 602). Inasmuch as the cross-support structures 604 provide a mechanical interface with the outer surfaces 404, 406 of the current collectors 204, 212, there is no need for the tension bearing structures to be rigidly affixed (e.g., via welding, soldering, etc.) to the current collectors 204, 212.

Figure 8:
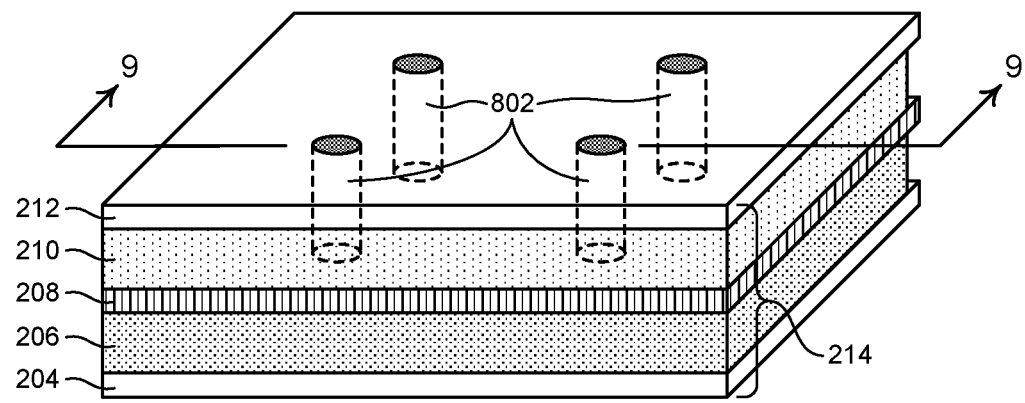
FIG. 8 illustrates the example battery cell stack of FIGS. 2 and 3 with different example tension bearing structures extending therethrough.
Figure 9:
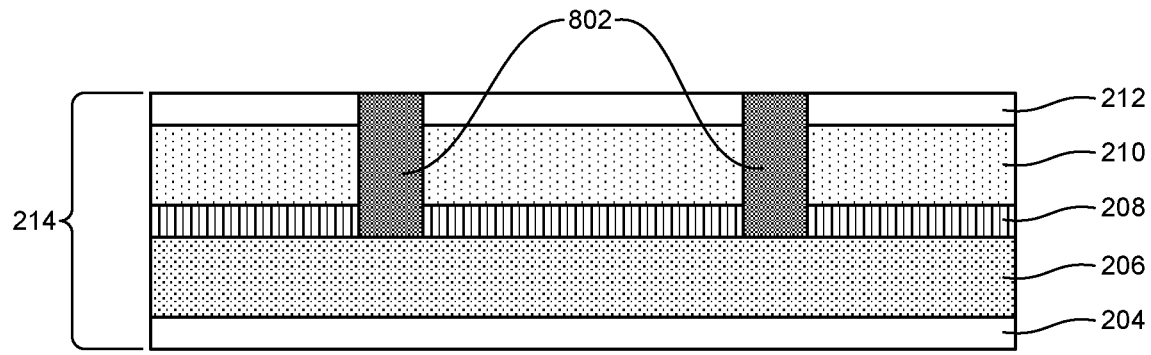
FIG. 9 illustrates a cross-sectional view of the example battery cell stack of FIG. 4.

FIG. 8 illustrates the example battery cell stack 214 of FIGS. 2 and 3 with different example tension bearing structures 802 extending therethrough. FIG. 9 illustrates a cross-sectional view of the example battery cell stack 214 taken along the line 9-9 of FIG. 8. In this example, the tension bearing structures 802 extend through less than an entirety of the battery cell stack 214. More particularly, in this example, the tension bearing structures 802 extend through the separator 208, the anode 210, and the anode current collector 212 without extending through the cathode 206 or the cathode current collector 204. Further, in this example, the ends of the tension bearing structures 802 are affixed to the separator 208 and the anode current collector 212 to impose a compressive force on the anode 210 without compressing the cathode 206. In other examples, the tension bearing structures 802 extend through the cathode 206 without extending through the anode 210.

In some examples, different types and/or designs for the tension bearing structures 216, 402, 602, 802 shown and described in connection with FIGS. 2-9 can be implemented in any combination. That is, in some examples, different ones of the tension bearing structures 216, 402, 602, 802 may be implemented in a single battery cell stack 214. Furthermore, in some examples, the means for coupling the ends of the tension bearing structures 216, 402, 602, 802 to the layers of the battery cell stack 214 (and/or the wall of the package 202) can be combined in any manner. Examples means for coupling the ends of the tension bearing structures 216, 402, 602, 802 include the metal caps 218, welds (with or without the metal caps 218), solder joints (with or without the metal caps 218), adhesives, overhanging and/or outcropping surfaces (including the flanges 408 and cross-support structures 604). In some examples, any one of the metal caps 218 shown in FIG. 3, the flanges 408 shown in FIGS. 4 and 5, and/or the cross-support structures 604 shown in FIGS. 6 and 7 can be implemented on the shorter tension bearing structures 802 of FIG. 8, Additionally or alternatively, the metal caps 218 can have a larger outer diameter that defines a flange that extends over an underlying layer of the battery cell stack 214 in a manner similar to the flanges 408 shown in FIGS. 4 and 5. In other examples, the metal caps 218 are incorporated at different points (e.g., opposite ends) of a cross-support structure similar to the cross-support structures 604 shown in FIGS. 6 and 7. In other examples, different ones of the flanges 408 in FIGS. 4 and 5 are interconnected by cross-support structure similar to the cross-support structures 604 shown in FIGS. 6 and 7. Further, in some examples, different ones of the means for coupling the ends of the tension bearing structures 216, 402, 602, 802 to the battery cell stack are used at different ends of the tension bearing structures 216, 402, 602, 802.

As described above, a purpose of the tension bearing structures 216, 402, 602, 802 is to impose compressive forces or apply pressure to the anode to reduce (e.g., prevent) particles in the anode (made of silicon and/or lithium) from separating from one another and/or from the adjacent anode current collector 212, which can lead to the formation of cracks and/or voids in the battery cell stack 214. Such cracks and/or voids can lead to early failures (e.g., shorten the useful cycle life) of the battery. In some examples, the battery 200 of FIGS. 2 and 3 includes a sensor 302 to monitor the conductivity, resistance, and/or impedance between the anode 210 and the anode current collector 212. In such examples, changes in the conductivity, resistance, and/or impedance can be used to infer the formation of potential cracks, voids, and/or other failures in the battery. Such information can be used to trigger a warning or notification of a potential battery failure and/or to disable use of the battery for safety and/or other reasons. While the cathode 206 is not expected to swell and shrink as much as the anode 210, in some examples, a similar sensor 304 can be positioned to monitor the conductivity, resistance, and/or impedance between the cathode 206 and the cathode current collector 204. The sensors 302, 304 are shown in FIG. 3 for purposes of illustration but are optional. That is, in other examples, one or both of the sensors 302, 304 are omitted. The sensors 302, 304 are means for detecting at least one of a conductivity, a resistance, or an impedance.

Figure 10:
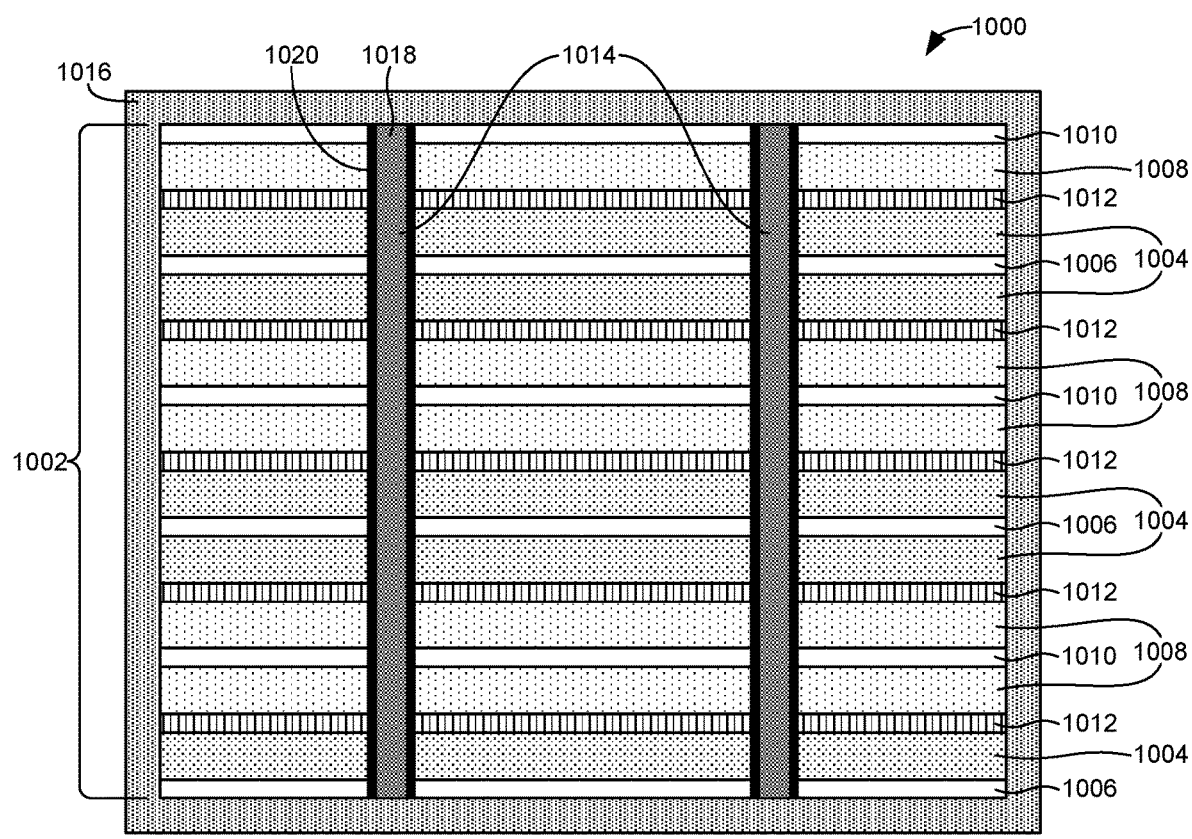
FIG. 10 illustrates another example battery constructed in accordance with teachings disclosed herein

The example battery 200 of FIGS. 2 and 3 includes a simple battery cell stack 214 that includes only a single layer of each of the cathode current collector 204, the cathode 206, the separator 208, the anode 210, and the anode current collector 212. However, teachings disclosed herein can be suitably adapted to more complex battery cell stacks and/or different types of batteries (e.g., cylindrical battery cells, button battery cells, prismatic battery cells, pouch battery cells, etc.). For instance, FIG. 10 illustrates another example battery 1000 that includes a battery cell stack 1002 that includes multiple layers for the cathode 1004 with multiple layers for the cathode current collector 1006. Likewise, the example battery 1000 of FIG. 10 includes multiple layers for the anode 1008 with multiple layers for the anode current collector 1010. Further, as shown in the illustrated examples, multiple layers for the separator 1012 are provided between the different layers of the cathode 1004 and the anode 1008. In some examples, different ones of the different layers are separately stacked on one another as independent and distinct layers in the battery cell stack 1002. In other examples, the different layers shown in FIG. 10 correspond to continuous elongate sheets of material that have been folded on themselves such that different portions of the continuous sheets overlap, thereby resulting in the multiple layers of the same material in the battery cell stack 1002. The number of layers and/or the particular order in which the layers are stacked in the battery cell stack 1002 can be suitably adapted in accordance with teachings disclosed herein.

As shown in the illustrated example of FIG. 10, The battery 1000 includes tension bearing structures 1014 that extend through the multiple layers of each of the cathode 1004, the cathode current collector 1006, the anode 1008, and the anode current collector 1010, and the separator 1012. As described above in connection with FIGS. 2-9, ends of the tension bearing structures 1014 are mechanically coupled to opposite sides of the battery cell stack 1002 so that tension in the tension bearing structures 1014 produce compressive forces on the battery cell stack 1002 that can counteract any swelling of the anode 1008. As described above, the tension bearing structures 1014 can be affixed to the outermost current collectors 1006, 1010, the walls of the exterior package or housing 1016 of the battery, and/or some combination of the two.

For purposes of illustration, the tension bearing structures 1014 of FIG. 10 are represented as including a conductive (e.g., metal) core 1018 and an insulative coating, shell, or exterior 1020. However, the tension bearing structures 1014 of the illustrated example of FIG. 10 may be constructed in any suitable manner. Further, the tension bearing structures 1014 of FIG. 10 can be attached to the current collectors 1006, 1010 and/or the walls of the package 1016 in any suitable manner (e.g., using any of the methods shown and described above in connection with FIGS. 2-9).

Figure 11:
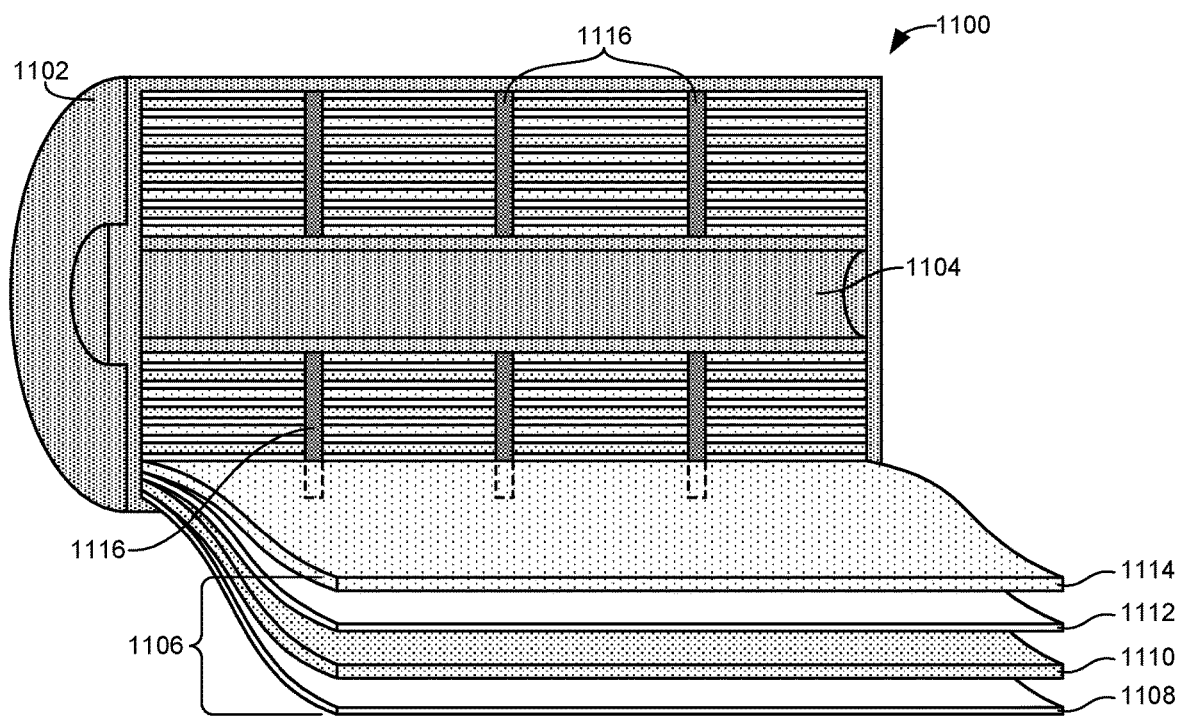
FIG. 11 illustrates another example battery constructed in accordance with teachings disclosed herein

FIG. 11 illustrates another example battery 1100 constructed in accordance with teachings disclosed herein. As shown in the illustrated example, the battery 1100 is a cylindrical battery defined by a cylindrical exterior package or housing 1102 with a cylindrical core 1104. In this example, a battery cell stack 1106 includes a first separator 1108, an anode 1110, a second separator 1112, and a cathode 1114, each of which corresponds to an elongate sheet of material that has been repeatedly wrapped or wound around the cylindrical core 1104 of the battery 1100. As a result of the repeated winding of the battery cell stack 1106 around the cylindrical core 1104, the battery 1100 includes multiple layers of each of first separator 1108, the anode 1110, the second separator 1112, and the cathode 1114 radially stacked on one another. In some examples, the ordering of the layers may be reversed or otherwise rearranged. Further, in some examples, additional layers of material (e.g., additional separators and/or current collectors) are also included in the battery cell stack 1106.

As shown in the illustrated example of FIG. 11, the battery 1100 includes a plurality of tension bearing structures 1116 that extend radially between the cylindrical core 1104 and the outer wall of the exterior package 1102. In some examples, ends of the tension bearing structures 1116 are mechanically coupled to the cylindrical core 1104, the exterior package 1102, and/or one or both of the separators 1108, 1112 to apply a compressive force on the layers of the anode 1110 positioned therebetween. As with the illustrated examples of FIGS. 2-10, the tension bearing structures 1116 of FIG. 11 can be constructed in any suitable manner and attached to inner and outer diameters of the wound battery cell stack 1106 in any suitable manner.

In the illustrated examples of both FIG. 10 and FIG. 11, the tension bearing structures 1014, 1116 extend through all of the multiple layers of materials in the respective battery cell stacks 1002, 1106. However, in other examples, different ones of the tension bearing structures 1014, 1116 extend through different subsets of the layers. For instance, unlike what is shown in FIG. 11, in which the tension bearing structures 1116 extend through multiple windings of the battery cell stack 1106, in other examples, the tension bearing structures 1116 may be added to the battery cell stack 1106 before it is wound around the cylindrical core 1104. In such examples, each tension bearing structure 1116 extends through only one layer of the anode 1110 and one layer of the cathode 1114, but different tension bearing structures 1116 will extend through different levels of winding at different radial positions between the cylindrical core 1104 and the exterior package 1102.

The foregoing example batteries 200, 1000, 1100 and the different example tension bearing structures 216, 402, 602, 802, 1014, 1116 of FIGS. 2-11 teach or suggest different features. Although each example battery 200, 1000, 1100 and the different example tension bearing structures 216, 402, 602, 802, 1014, 1116 disclosed above has certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features. More particularly, one or both of the sensors 302, 304 shown in FIG. 3 can be implemented in the illustrated example batteries 1000, 1100 of FIGS. 10 and 11. Further, any of the tension bearing structures 216, 402, 602, 802, 1014, 1116 of FIGS. 2-11 can be implemented in any one of the batteries 200, 1000, 1100 of FIGS. 2-11. Any of the tension bearing structures 216, 402, 602, 802, 1014, 1116 is a means for reducing swelling of a battery cell stack. Likewise, any of the tension bearing structures 216, 402, 602, 802, 1014, 1116 is a means for applying pressure on a battery cell stack.

Figure 12:
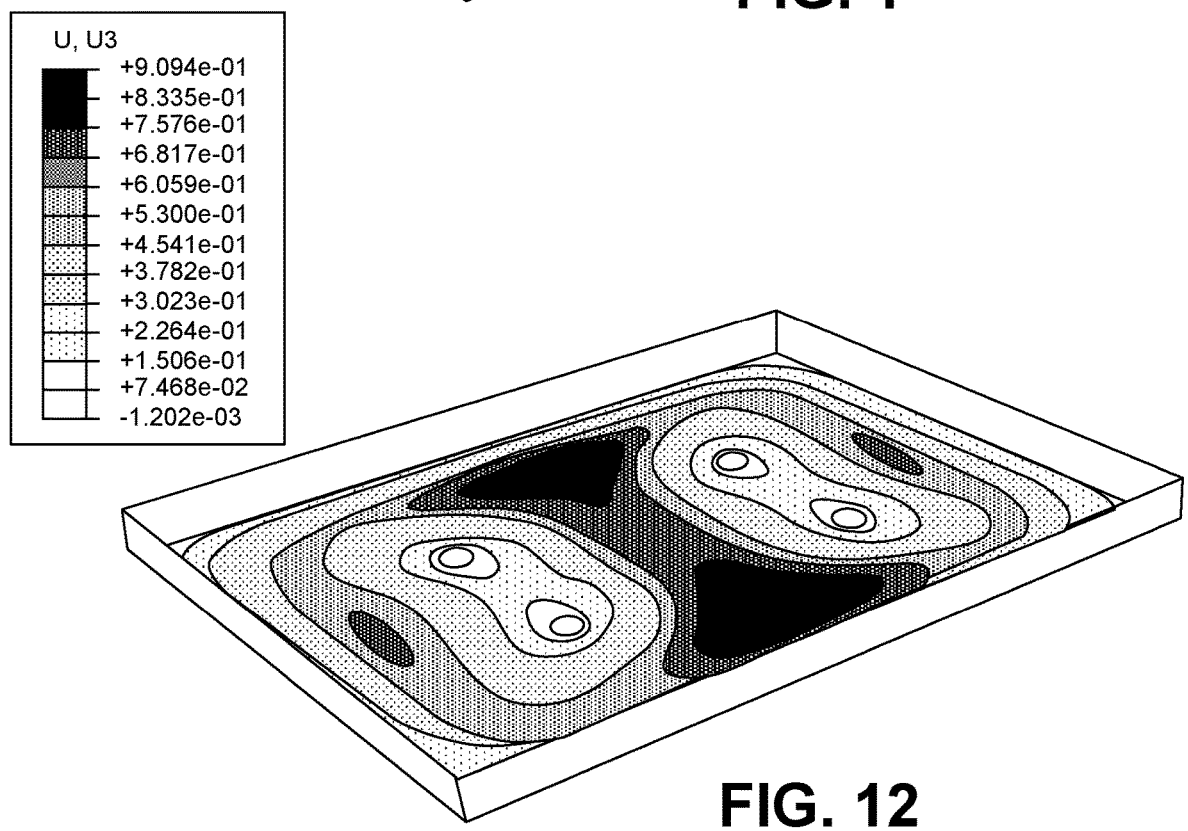
FIG. 12 illustrates the results of a simulation showing an amount of deflection (in millimeters) of a battery that includes tension bearing structures as disclosed herein.

Simulations of batteries constructed in accordance with teachings disclosed herein demonstrate the ability to apply 0.5 atm of pressure on a battery to increase the number of recharges during the useful cycle life by reducing swelling without the need to increase the wall thickness of the external package. In particularly, as already discussed above, the simulation represented in FIG. 1 (in which no tension bearing structures are employed) required a 0.6 mm thick package wall to achieve 0.5 atm of pressure and resulted in a deflection of approximately 1.6 mm. By contrast, FIG. 12 illustrates the results of a simulation showing the deflection of a similarly dimensioned battery (e.g., 4 mm by 60 mm, by 80 mm) constructed in accordance with teachings disclosed herein. More particularly, in the simulation, the battery included four separate tension bearing structures arranged in a manner similar to what is shown in the illustrated example of FIG. 2. In this example, the tension bearing structures have 3 mm diameters and the pillar tension stress due to the 0.5 atm of pressure is 4.5 MPa. As represented in FIG. 12, the deflection of the battery is maintained to approximately 0.9 mm, which corresponds to a 40% reduction in deformation when compared with the simulation represented in FIG. 1. A further reduction may be possible through the use of additional tension bearing structures and/or different placement of the tension bearing structures.

Significantly, in the simulation of FIG. 12, the 0.5 atm of pressure applied to the battery was obtained through the use of the tension bearing structures without increasing the package wall thickness from a nominal thickness of 0.3 mm. That is, the wall thickness in the simulated example of FIG. 12 is half the wall thickness required in the simulated example of FIG. 1. The halving of the wall thickness (in FIG. 12 as compared with FIG. 1) corresponds to an approximately 50% reduction in the weight of the package housing (e.g., from 25 g to 12.5 g). Furthermore, the reduction in wall thickness enables additional space inside the batter for a larger battery cell stack, which gives rise to longer battery life. More particularly, simulated results reveal that the expected life of the example battery of FIG. 12 is approximately 8.44 hours, which is over a 5% increase from the 8 hours expected for a traditional (graphite anode) battery of the same size. Notably, the simulations represented in FIG. 12 are based on conservative assumptions. As such, it is expected that different battery designs and/or a different number of tension bearing structures and/or tension bearing structures with different sizes and/or at different locations would reliably achieve even greater increases to battery life. Further, while the above simulation were based on 0.5 atm of pressure, in some examples, the tension bearing structures may apply a greater or less amount of pressure than 0.5 atm.

Figure 13:
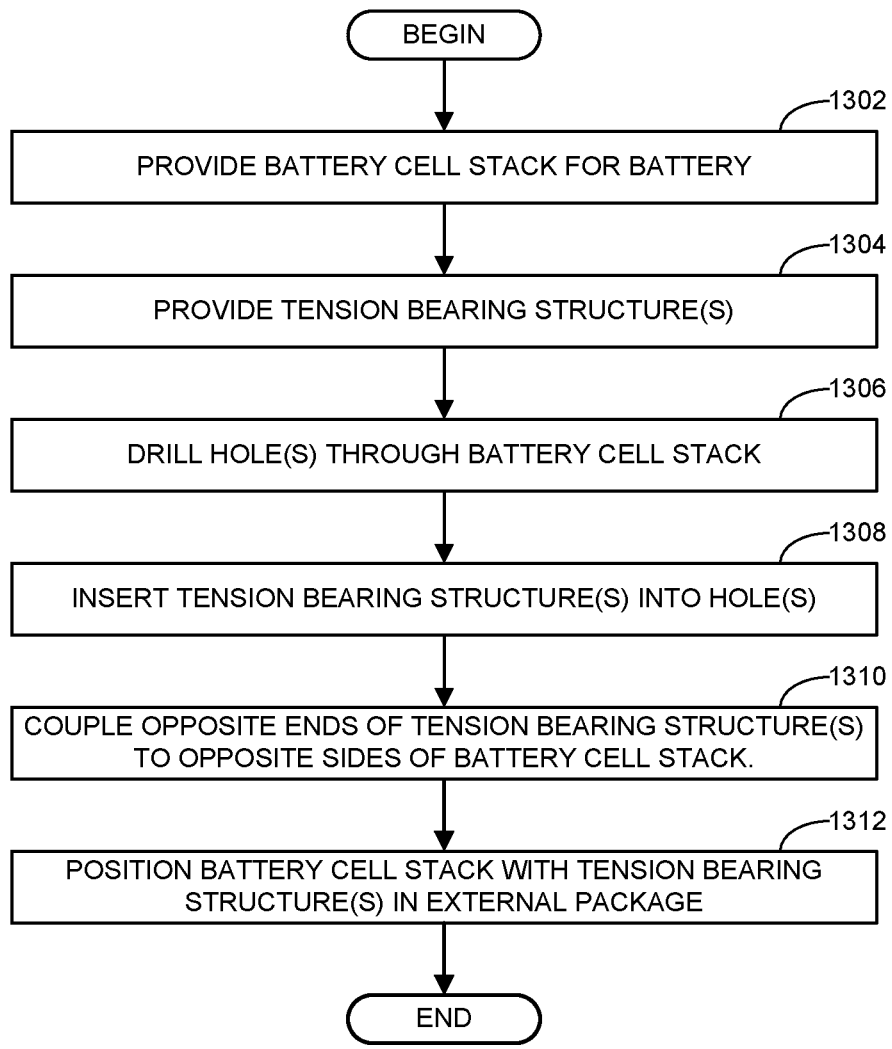
FIG. 13 is a flowchart illustrating an example method for manufacturing any of the example batteries of FIGS. 2-11.

FIG. 13 is a flowchart illustrating an example method for manufacturing any of the example batteries 200, 1000, 1100 disclosed herein. Although the example method is described with reference to the flowchart illustrated in FIG. 13, many other methods of manufacturing the example batteries 200, 1000, 1100 may alternatively be used. For example, the order of execution of the blocks may be changed, and/or some of the blocks described may be changed, eliminated, or combined.

The example method begins at block 1302 by providing a battery cell stack (e.g., any one of the battery cell stacks 214, 1002, 1106) for a battery. At block 1304, the method involves providing one or more tension bearing structure(s) (e.g., any one of the tension bearing structures 216, 402, 602, 802, 1014, 1116). The tension bearing structure(s) can be manufactured and provided using any suitable process (e.g., extrusion, injection molding, etc.). At block 1306, the method involves drilling one or more hole(s) through the battery cell stack. In some examples, the drilling is accomplished through a laser drilling process. At block 1308, the method involves inserting the tension bearing structure(s) into the hole(s). In some examples, the order of operation of blocks 1304-1308 is changes to fabricate the tension bearing structure(s) within the hole(s). That is, in some examples, the hole(s) are drilled first. Thereafter, a precursor material is deposited onto the walls of the hole(s) and the main body of the tension bearing member is then formed from the precursor (e.g., through polymerization for polymer-based tension bearing structures or electroplating for metal based tension bearing structures).

At block 1310, the method involves coupling the opposite ends of the tension bearing structure(s) to opposite sides of the battery cell stack. In some examples, the ends of the tension bearing structure(s) are affixed directly to a layer (e.g., an outermost layer) of the battery cell stack. Additionally or alternatively, in some examples, the ends of the tension bearing structure(s) are affixed to a package wall surrounding the battery cell stack. The tension bearing structure(s) can be affixed to the appropriate interfacing material using any suitable process (e.g., welding (e.g., laser welding, ultrasonic welding), adhesive (e.g., lamination), etc.). In other examples, the tension bearing structure(s) are coupled without being directly affixed to the layers of the battery cell stack. Rather, in some such examples, the tension bearing structures are mechanically coupled to the battery cell stack through flanges, cross-support structures, and/or other protrusions or outcroppings at the ends of the tension bearing structures that overlap and interface with outer surfaces of the battery cell stack. At block 1312, the method involves positioning the battery cell stack with the tension bearing structure(s) in an external package (e.g., any one of the packages 202, 1016, 1102). In some examples, block 1312 is implemented prior to block 1310 to properly position the components before the tension bearing structure(s) are affixed at either end. Thereafter, the example method of FIG. 13 ends.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

From the foregoing, it will be appreciated that example systems, methods, apparatus, and articles of manufacture have been disclosed that enable the creation of pressure or compressive forces on a battery cell stack to counteract deformations that can arise from the swelling and shrinkage of the materials in the battery cell stack (e.g., silicon and/or lithium anode) during the charging and discharging of the battery. Reducing such deformations can reduce battery failures arising from cracks and/or voids forming in the battery cell stack. As a result, examples disclosed herein can increase the useful cycle life for batteries. Moreover, such advantages are achieved without increasing the thickness of the walls of an external package or housing for the battery, which can reduce the weight of batteries and increase the amount of space available for the battery cell stack. Thus, in addition to contributing to a longer cycle life, examples disclosed herein also enable batteries that are lighter and have higher energy densities, which result in a longer battery life between a fully charged and fully discharged state of the battery.

Further examples and combinations thereof include the following:

Example 1 includes a battery comprising an anode layer, a cathode layer stacked with the anode layer, and a tension bearing structure to extend through at least one of the anode layer or the cathode layer.

Example 2 includes the battery of example 1, further including a separator positioned between the anode layer and the cathode layer, the tension bearing structure to extend through the separator, an exterior surface of a first portion of the tension bearing structure being electrically insulative, an exterior surface of a second portion of the tension bearing structure being electrically conductive, the first portion to span across the separator, the second portion at an end of the tension bearing structure.

Example 3 includes the battery of example 2, wherein the tension bearing structure includes a main body and a metal cap, the main body corresponding to the first portion, the metal cap corresponding to the second portion.

Example 4 includes the battery of any one of examples 1-3, wherein the tension bearing structure is at least one of spring-shaped or accordion-shaped.

Example 5 includes the battery of any one of examples 1-3, wherein the tension bearing structure is an elongate pillar.

Example 6 includes the battery of any one of examples 1-3, wherein the tension bearing structure is a sheet.

Example 7 includes the battery of any one of examples 1-3, wherein the tension bearing structure has a honeycomb cross-section.

Example 8 includes the battery of any one of examples 1-7, wherein the tension bearing structure includes an electrically conductive core and an electrically insulative exterior surface.

Example 9 includes the battery of any one of examples 1-8, wherein the tension bearing structure is ionically conductive.

Example 10 includes the battery of any one of examples 1-9, wherein the tension bearing structure includes a ceramic material.

Example 11 includes the battery of any one of examples 1-10, wherein the tension bearing structure includes an elastic material.

Example 12 includes the battery of any one of examples 1-11, further including an anode current collector adjacent the anode layer, the anode layer between the cathode layer and the anode current collector, and a cathode current collector adjacent the cathode layer, the cathode layer between the anode layer and the cathode current collector, the tension bearing structure to extend through at least one of the anode current collector or the cathode current collector.

Example 13 includes the battery of example 12, further including a sensor to detect at least one of conductivity, resistance, or impedance between the anode layer and the anode current collector.

Example 14 includes the battery of any one of examples 12 or 13, wherein a first end of the tension bearing structure is coupled to the anode current collector, and second end of the tension bearing structure is coupled to the cathode current collector.

Example 15 includes the battery of any one of examples 12-14, wherein an end of the tension bearing structure includes a flange that extends away from a main body of the tension bearing structure, an inner surface of the flange to interface with an outer surface of the at least one of the anode current collector or the cathode current collector.

Example 16 includes the battery of any one of examples 12-15, wherein the tension bearing structure is a first tension bearing structure, the battery further including a second tension bearing structures that extends through the at least one of the anode layer or the cathode layer and extends through the at least one of the anode current collector or the cathode current collector, and a cross-support structure extending between and coupled to a first end of the first tension bearing structure and a second end of the second tension bearing structure, the cross-support structure to extend across an outer surface of the at least one of the anode current collector or the cathode current collector.

Example 17 includes the battery of any one of examples 1-16, further including a housing to enclose the anode layer and the cathode layer, an end of the tension bearing structure affixed to a wall of the housing.

Example 18 includes the battery of any one of examples 1-17, wherein the tension bearing structure is not directly affixed to the anode layer and is not directly affixed to the cathode layer.

Example 19 includes the battery of any one of examples 1-18, wherein the anode layer is a first anode layer, and the battery further includes a second anode layer stacked with the first anode layer and the cathode layer, the tension bearing structure to extend through both the first anode layer and the second anode layer.

Example 20 includes the battery of any one of examples 1-19, wherein a base material for the anode layer includes at least one of silicon or lithium.

Example 21 includes the battery of any one of examples 1-20, wherein the tension bearing structure is one of a plurality of tension bearing structures that extend through both the anode layer and the cathode layer.

Example 22 includes a battery comprising a battery cell stack including an anode, a separator, and a cathode, the separator between the anode and the cathode, a package to enclose the battery cell stack, and means for applying a pressure on the battery cell stack, the pressure applying means to extend through the anode, the separator, and the cathode.

Example 23 includes the battery of example 22, wherein the battery cell stack includes multiple layers of the anode and multiple layers of the cathode, the pressure applying means to extend through the multiple layers of the anode and through the multiple layers of the cathode.

Example 24 includes the battery of any one of examples 22 or 23, wherein the battery cell stack includes a first current collector at a first side of the battery cell stack and a second current collector at a second side of the battery cell stack, the first side adjacent a first wall of the package, the second side adjacent a second wall of the package, the pressure applying means to extend through the first current collector and the second current collector.

Example 25 includes the battery of example 24, wherein the pressure applying means is directly affixed to at least one of the first current collector or the first wall of the package, and the pressure applying means is directly affixed to at least one of the second current collector or the second wall of the package.

Example 26 includes the battery of any one of examples 24 or 25, further including means for detecting at least one of a conductivity, a resistance, or an impedance between the anode and the anode current collector.

Example 27 includes a method comprising providing a battery cell stack for a battery, and providing a tension bearing structure through the battery cell stack, the tension bearing structure to extend transverse to layers in the battery cell stack.

Example 28 includes the method of example 27, further including positioning the battery cell stack in an external package, and coupling an end of the tension bearing structures to a wall of the external package.

Example 29 includes the method of any one of examples 27 or 28, further including coupling an end of the tension bearing structures to an outermost layer in the battery cell stack.

Example 30 includes the method of any one of examples 27-29, further including laser drilling a hole through the battery cell stack, the tension bearing structure to be positioned within the hole.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A battery comprising:
   an anode layer;
   a cathode layer stacked with the anode layer;
   an anode current collector adjacent the anode layer, the anode layer between the cathode layer and the anode current collector;
   a cathode current collector adjacent the cathode layer, the cathode layer between the anode layer and the cathode current collector; and
   a tension bearing structure to extend through at least one of the anode layer or the cathode layer, the tension bearing structure to extend through at least one of the anode current collector or the cathode current collector.

2. The battery of claim 1, including a sensor to detect at least one of conductivity, resistance, or impedance between the anode layer and the anode current collector.

3. The battery of claim 1, wherein a first end of the tension bearing structure is coupled to the anode current collector, and a second end of the tension bearing structure is coupled to the cathode current collector.

4. The battery of claim 1, wherein an end of the tension bearing structure includes a flange that extends away from a main body of the tension bearing structure, an inner surface of the flange to interface with an outer surface of the at least one of the anode current collector or the cathode current collector.

5. The battery of claim 1, wherein the tension bearing structure is a first tension bearing structure, the battery including:
   a second tension bearing structure that extends through the at least one of the anode layer or the cathode layer and extends through the at least one of the anode current collector or the cathode current collector; and
   a cross-support structure extending between and coupled to a first end of the first tension bearing structure and a second end of the second tension bearing structure, the cross-support structure to extend across an outer surface of the at least one of the anode current collector or the cathode current collector.

6. A battery comprising:
   an anode layer;
   a cathode layer stacked with the anode layer;
   a tension bearing structure to extend through at least one of the anode layer or the cathode layer; and
   a separator between the anode layer and the cathode layer, the tension bearing structure to extend through the separator, an exterior surface of a first portion of the tension bearing structure is electrically insulative, an exterior surface of a second portion of the tension bearing structure is electrically conductive, the first portion to span across the separator, the second portion at an end of the tension bearing structure.

7. The battery of claim 6, wherein the tension bearing structure includes a main body and a metal cap, the main body corresponding to the first portion, the metal cap corresponding to the second portion.

8. A battery comprising:
   an anode layer;
   a cathode layer stacked with the anode layer; and
   a tension bearing structure to extend through at least one of the anode layer or the cathode layer, the tension bearing structure including an electrically conductive core and an electrically insulative exterior surface.

9. A battery comprising:
   an anode layer;
   a cathode layer stacked with the anode layer; and
   a tension bearing structure to extend through at least one of the anode layer or the cathode layer, the tension bearing structure being ionically conductive.

10. A battery comprising:
an anode layer;
a cathode layer stacked with the anode layer; and
a tension bearing structure to extend through at least one of the anode layer or the cathode layer, the tension bearing structure including a ceramic material.

11. A battery comprising:
an anode layer;
a cathode layer stacked with the anode layer; and
a tension bearing structure to extend through at least one of the anode layer or the cathode layer, the tension bearing structure including an elastic material.

12. A battery comprising:
an anode layer;
a cathode layer stacked with the anode layer;
a housing to enclose the anode layer and the cathode layer; and
a tension bearing structure to extend through at least one of the anode layer or the cathode layer, an end of the tension bearing structure affixed to a wall of the housing.

13. A battery comprising:
an anode layer;
a cathode layer stacked with the anode layer; and
a tension bearing structure to extend through at least one of the anode layer or the cathode layer, wherein the tension bearing structure is not directly affixed to the anode layer and is not directly affixed to the cathode layer.

14. A battery comprising:
a first anode layer;
a cathode layer stacked with the first anode layer;
a second anode layer stacked with the first anode layer and the cathode layer; and
a tension bearing structure to extend through both the first anode layer and the second anode layer.

15. The battery of claim 6, wherein a base material for the anode layer includes at least one of silicon or lithium.

16. A battery comprising:
a battery cell stack including an anode, a separator, and a cathode, the separator between the anode and the cathode;
a package to enclose the battery cell stack; and
means for applying a pressure on the battery cell stack, the pressure applying means to extend through the anode, the separator, and the cathode.

17. The battery of claim 16, wherein the battery cell stack includes multiple layers of the anode and multiple layers of the cathode, the pressure applying means to extend through the multiple layers of the anode and through the multiple layers of the cathode.

18. The battery of claim 16, wherein the battery cell stack includes a first current collector at a first side of the battery cell stack and a second current collector at a second side of the battery cell stack, the first side adjacent a first wall of the package, the second side adjacent a second wall of the package, the pressure applying means to extend through the first current collector and the second current collector.

19. The battery of claim 18, wherein the pressure applying means is directly affixed to at least one of the first current collector or the first wall of the package, and the pressure applying means is directly affixed to at least one of the second current collector or the second wall of the package.

20. A method comprising:
providing a battery cell stack for a battery;
providing a tension bearing structure through the battery cell stack, the tension bearing structure to extend transverse to layers in the battery cell stack;
positioning the battery cell stack in an external package; and
coupling an end of the tension bearing structure to a wall of the external package.

21. The method of claim 20, including coupling an end of the tension bearing structure to an outermost layer in the battery cell stack.

22. A method comprising:
providing a battery cell stack for a battery;
laser drilling a hole through the battery cell stack; and
providing a tension bearing structure through the battery cell stack, the tension bearing structure to extend transverse to layers in the battery cell stack, the tension bearing structure positioned within the hole.

23. The battery of claim 6, wherein the tension bearing structure is at least one of (i) spring-shaped, (ii) accordion-shaped, (iii) an elongate pillar, or (iv) a sheet.

24. The battery of claim 6, wherein the tension bearing structure has a honeycomb cross-section.

* * * * *